(12) United States Patent
Cao

(10) Patent No.: US 6,556,320 B1
(45) Date of Patent: *Apr. 29, 2003

(54) TUNABLE CHROMATIC DISPERSION, DISPERSION SLOPE, AND POLARIZATION MODE DISPERSION COMPENSATOR UTILIZING A VIRTUALLY IMAGED PHASED ARRAY

(75) Inventor: Simon X. F. Cao, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/574,421

(22) Filed: May 19, 2000

(51) Int. Cl.[7] .................. H04J 14/06; H04J 14/02; G02B 5/30; G02B 6/26; G02B 27/42
(52) U.S. Cl. ............. 359/122; 359/124; 359/127; 359/130; 359/131; 359/487; 359/495; 359/496; 359/497; 359/498; 359/499; 359/566; 359/615; 359/618; 359/900; 385/31; 385/33; 385/37
(58) Field of Search ................ 359/484, 487, 359/494, 495, 496, 498, 558, 566, 577, 615, 618, 629, 633, 857, 861, 122, 124, 130, 131, 161, 127, 129, 900; 385/31, 33, 36, 37

(56) References Cited

U.S. PATENT DOCUMENTS

| 5,930,045 A | 7/1999 | Shirasaki |
|---|---|---|
| 5,969,865 A | 10/1999 | Shirasaki |
| 5,969,866 A | 10/1999 | Shirasaki |
| 5,973,838 A | 10/1999 | Shirasaki |
| 5,974,206 A | * 10/1999 | Bricheno et al. |
| 5,999,320 A | 12/1999 | Shirasaki |
| 6,028,706 A | 2/2000 | Shirasaki et al. |
| 6,055,081 A | * 4/2000 | Koyano et al. |
| 6,137,604 A | * 10/2000 | Bergano |
| 6,215,923 B1 | * 4/2001 | Li |
| 6,296,361 B1 | * 10/2001 | Shirasaki et al. |
| 6,307,677 B2 | * 10/2001 | Cao |
| 6,310,993 B1 | * 10/2001 | Cao et al. |
| 6,332,689 B1 | * 12/2001 | Shirasaki et al. |
| 6,343,866 B1 | * 2/2002 | Cao et al. |
| 6,441,959 B1 | * 8/2002 | Yang et al. |

* cited by examiner

Primary Examiner—Ricky D. Shafer
(74) Attorney, Agent, or Firm—Sawyer Law Group LLP

(57) ABSTRACT

The present invention provides a dispersion compensator which utilizes a Virtually Imaged Phased Array (VIPA), gratings, and birefringent wedges to moderate chromatic dispersion, dispersion slope and polarization mode dispersion. The dispersion compensator in accordance with the present invention propagates the composite optical signal in a forward direction; separates the wavelengths in the band of wavelengths in each of the plurality of channels, where each of the wavelengths in the band is spatially distinguishable from the other wavelengths in the band; spatially separates each band of wavelengths in the plurality of channels; spatially separates each wavelength of each separated band of wavelengths into a plurality of polarized rays; and reflects the plurality of polarized rays toward a return direction, where dispersion is added to the reflected plurality of polarized rays such that the unwanted chromatic dispersion, dispersion slope, and PMD are compensated. The dispersion compensator provides simultaneous tunable compensation of these various dispersions utilizing a single apparatus. A system which utilizes the compensator is thus cost effective to manufacture.

51 Claims, 13 Drawing Sheets

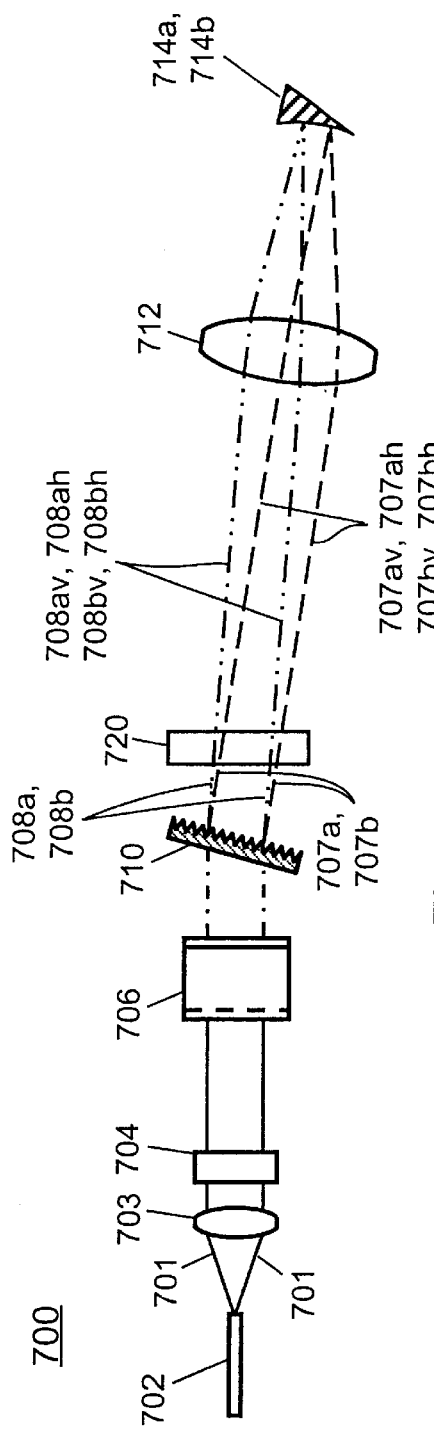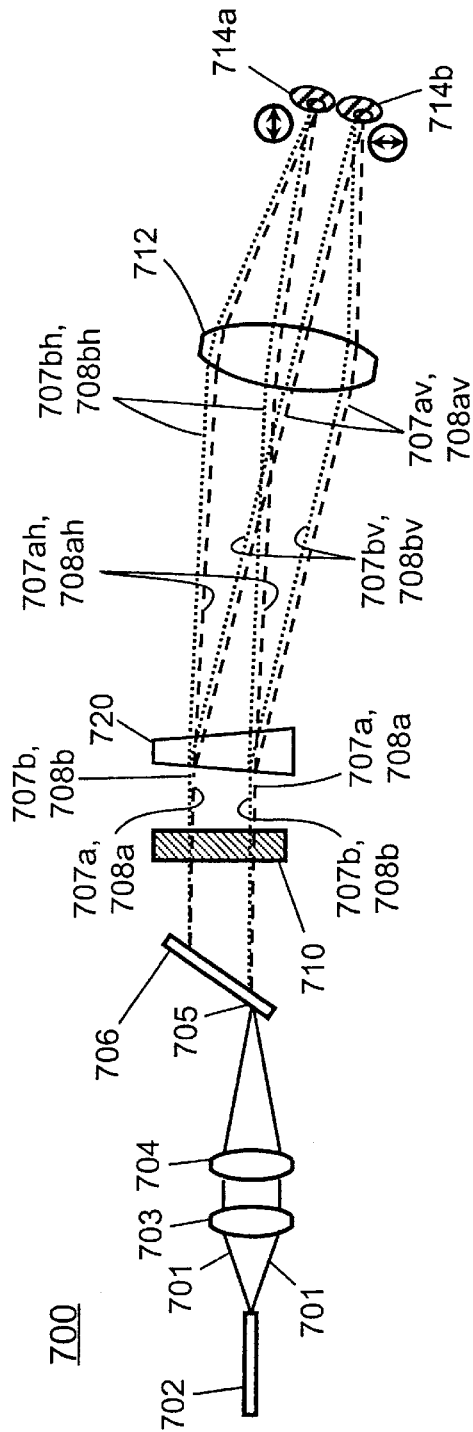

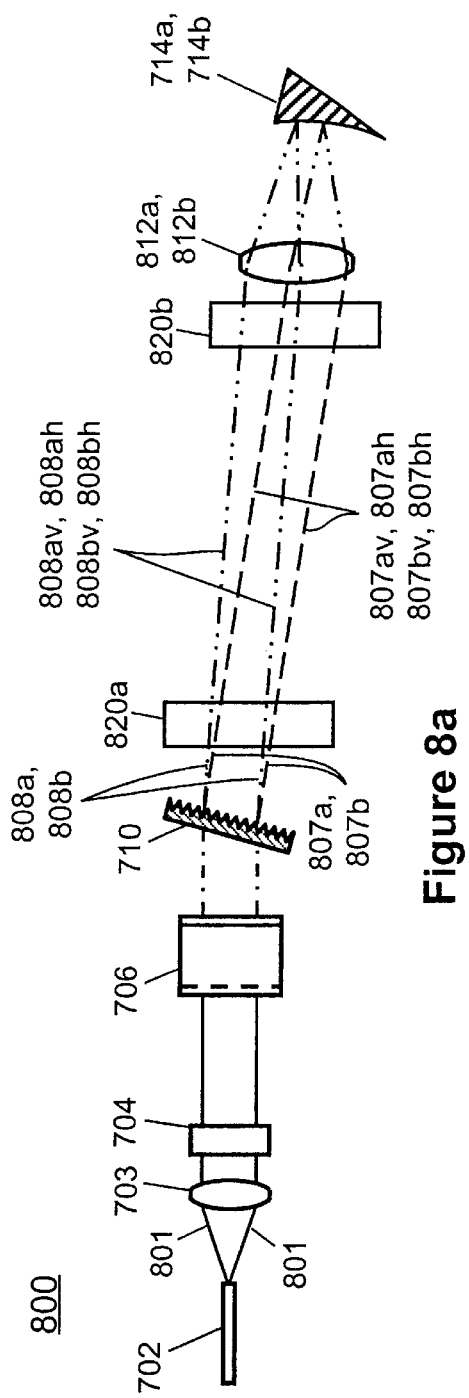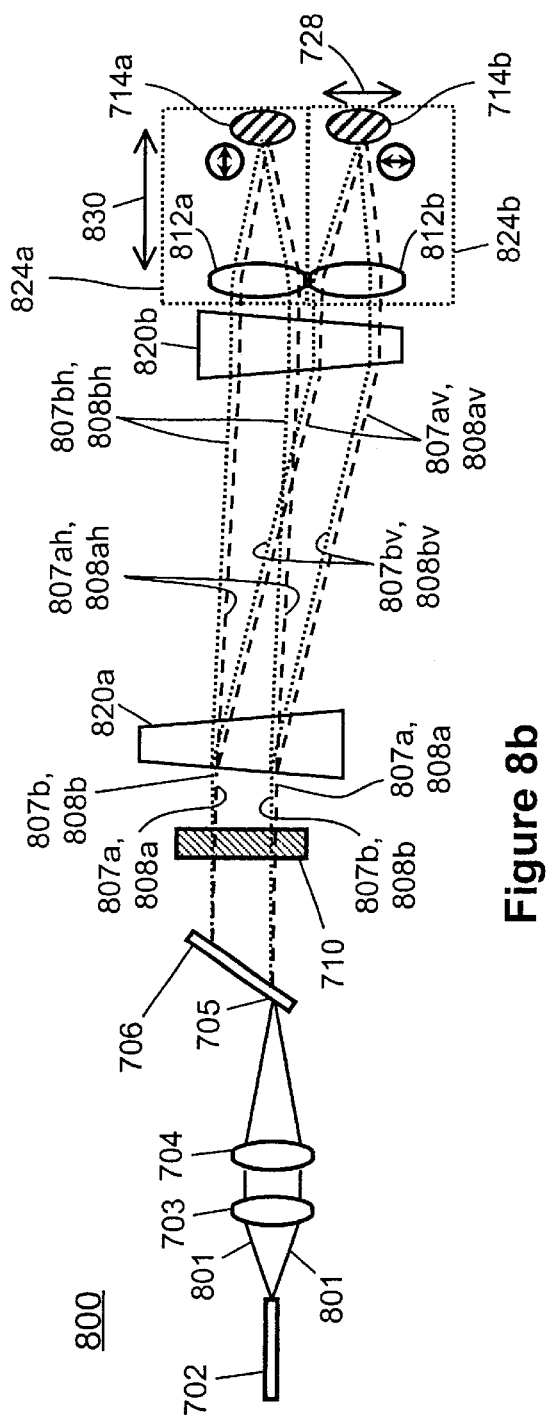
Figure 8a
Figure 8b

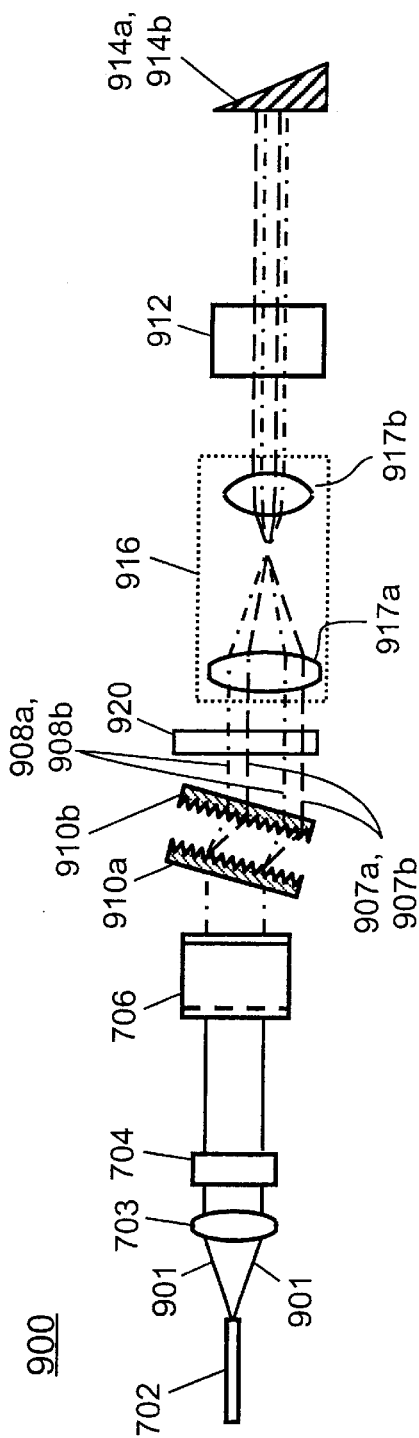
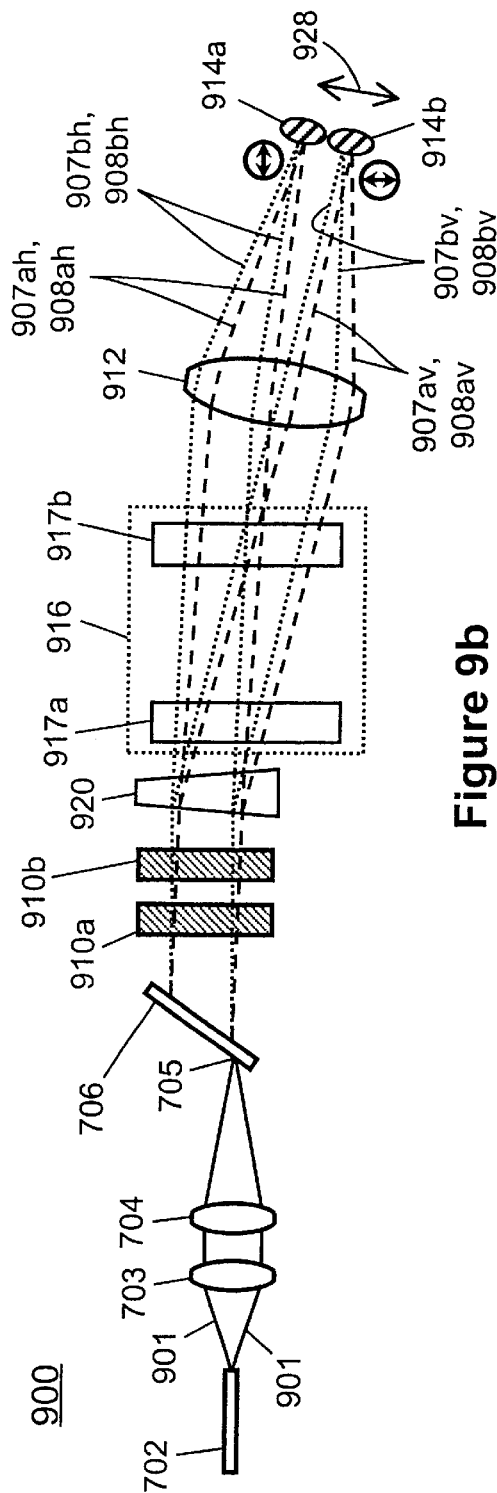
Figure 9a
Figure 9b

TUNABLE CHROMATIC DISPERSION, DISPERSION SLOPE, AND POLARIZATION MODE DISPERSION COMPENSATOR UTILIZING A VIRTUALLY IMAGED PHASED ARRAY

FIELD OF THE INVENTION

The present invention relates to chromatic dispersion, dispersion slope, and polarization mode dispersion compensation, and more particularly to dispersion compensation accumulated in a wavelength division multiplexed optical fiber transmission line.

BACKGROUND OF THE INVENTION

Fiber optic networks are becoming increasingly popular for data transmission because of their high speed and high capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

One common and well-known problem in the transmission of optical signals is chromatic dispersion of the optical signal. Chromatic dispersion refers to the effect wherein the channels comprising an optical signal travel through an optic fiber at different speeds, e.g., longer wavelengths travel faster than shorter wavelengths. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel.

For dense wavelength division multiplexer (DWDM) systems or for WDM or DWDM systems with a wide wavelength spacing between the shortest and longest wavelength channels, the common approach is to allow chromatic dispersion to accumulate within spans of fiber and to compensate for dispersion at the ends of spans through the use of in-line dispersion compensator apparatuses.

A second common and well-known problem in the transmission of optical signals is polarization mode dispersion (PMD). PMD is the phenomenon by which differently polarized components, or sub-signals, comprising an optical signal propagate with different speeds or, alternatively, propagate along differing-length optical paths. This duality of speeds or paths can also cause unacceptable broadening of the digital pulses comprising a signal that increases in severity with increasing transmission speed. The maximum acceptable PMD-inducted optical path length difference is the cumulative result of all PMD effects in all the optical elements through which a signal propagates, including fiber and non-fiber optical components. Although the PMD broadening of optical fiber increases as the square root of fiber length, the PMD broadening caused by birefringent components is linearly related to the cumulative optical path difference of all such components.

The chromatic dispersion characteristics of optical fibers are not constant but depend upon wavelength, as illustrated in FIG. 1, which presents graphs of Group Velocity Dispersion, D, against wavelength, for typical examples of three commonly used fiber types. In FIG. 1, the quantity D (ps-km$^{-1}$-nm$^{-1}$) is defined by the relationship of Eq. 1

$$D = \frac{d}{d\lambda}\left(\frac{1}{v_g}\right) = \frac{1}{L}\left(\frac{d\tau_g}{d\lambda}\right) \qquad (1)$$

in which $\lambda$ is the channel wavelength (nm), $v_g$ is the group velocity (km/ps), $\tau_g$ is the group delay time (ps), and L is the fiber length (km). If $v_g$ decreases with increasing wavelength (i.e., longer or "red" wavelengths travel slower than relatively shorter or "blue" wavelengths) then D is positive, otherwise D is negative. Because all three fiber types illustrated in FIG. 1 are deployed in telecommunications systems, the requirements for dispersion compensators vary widely. Furthermore, because of the existence of non-zero dispersion slope, S, a constant level of dispersion compensation does not accurately negate the dispersion of all channels. This inaccuracy can become a significant problem for high-speed data propagation, long span distances and/or wide distances between the shortest and longest wavelength channels.

Conventional apparatuses for dispersion compensation include dispersion compensation fiber, chirped fiber Bragg gratings coupled to optical circulators, and conventional diffraction gratings disposed as sequential pairs.

A dispersion compensation fiber, which is used in-line within a fiber communications system, has a special cross-section index profile so as to provide chromatic dispersion that is opposite to that of ordinary fiber within the system. The summation of the two opposite types of dispersion negates the chromatic dispersion of the system. However, dispersion compensation fiber is expensive to manufacture, has a relatively large optical attenuation, and must be relatively long to sufficiently compensate for chromatic dispersion.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is generally coupled to a fiber communications system through an optical circulator. By causing certain wavelength components to travel longer distances than other wavelength components, a controlled delay is added to those components and opposite dispersion can be added to a pulse. However, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system. Furthermore, fiber Bragg gratings generally do not compensate polarization mode dispersion.

A conventional diffraction grating has the property of outputting different wavelengths at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating that diffracts them a second time so as to set their pathways parallel to one another. Because the different lights travel with different angles between the two gratings, certain wavelength components are made to travel longer distances than other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, the two gratings of a spatial grating pair would have to be separated by a very large distance, thereby making such a spatial grating pair arrangement impractical.

Accordingly, there exists a need for an improved chromatic dispersion, dispersion slope, and polarization mode dispersion (PMD) compensator. The improved compensator should produce an adjustable chromatic dispersion and be readily adapted to provide either positive or negative chromatic dispersion, which can provide non-uniform dispersion compensation so as to compensate for fiber dispersion slope, and can also compensate for polarization mode dispersion. The present invention addresses such a need.

SUMMARY OF THE INVENTION

The present invention provides a dispersion compensator which utilizes a Virtually Imaged Phased Array (VIPA), gratings, and birefringent wedges to moderate chromatic dispersion, dispersion slope and polarzation mode dispersion. The dispersion compensator in accordance with the present invention propagates the composite optical signal in a forward direction; separates the wavelengths in the band of wavelengths in each of the plurality of channels, where each of the wavelengths in the band is spatially distinguishable from the other wavelengths in the band; spatially separates each band of wavelengths in the plurality of channels; spatially separates each wavelength of each separated band of wavelengths into a plurality of polarized rays; and reflects the plurality of polarized rays toward a return direction, where dispersion is added to the reflected plurality of polarized rays such that the unwanted chromatic dispersion, dispersion slope, and PMD are compensated. The dispersion compensator provides simultaneous tunable compensation of these various dispersions utilizing a single apparatus. A system which utilizes the compensator is thus cost effective to manufacture.

BRIEF DESCRIPTION OF THE FIGURES

FIGS. 7a and 7b illustrate a top-view and side-view, respectively, of a first preferred embodiment of a dispersion compensator in accordance with the present invention.

FIGS. 8a and 8b illustrate a top-view and side-view, respectively, of a second preferred embodiment of a dispersion compensator in accordance with the present invention.

FIGS. 9a and 9b illustrate a top-view and side-view, respectively, of a third preferred embodiment of a dispersion compensator in accordance with the present invention.

DETAILED DESCRIPTION

The present invention provides an improved chromatic dispersion, dispersion slope, and polarization mode dispersion (PMD) compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a dispersion compensator which comprises a Virtually Imaged Phased Array (VIPA) optically coupled on a first side to an optical communications system, and optically coupled on a second side to one or more transmission-type diffraction gratings and a mirror and one or more birefringent wedges. The VIPA assists in producing chromatic dispersion compensation, the diffraction grating assists in producing dispersion slope compensation, and the birefringent wedge assists in compensation for PMD.

Figure 1:
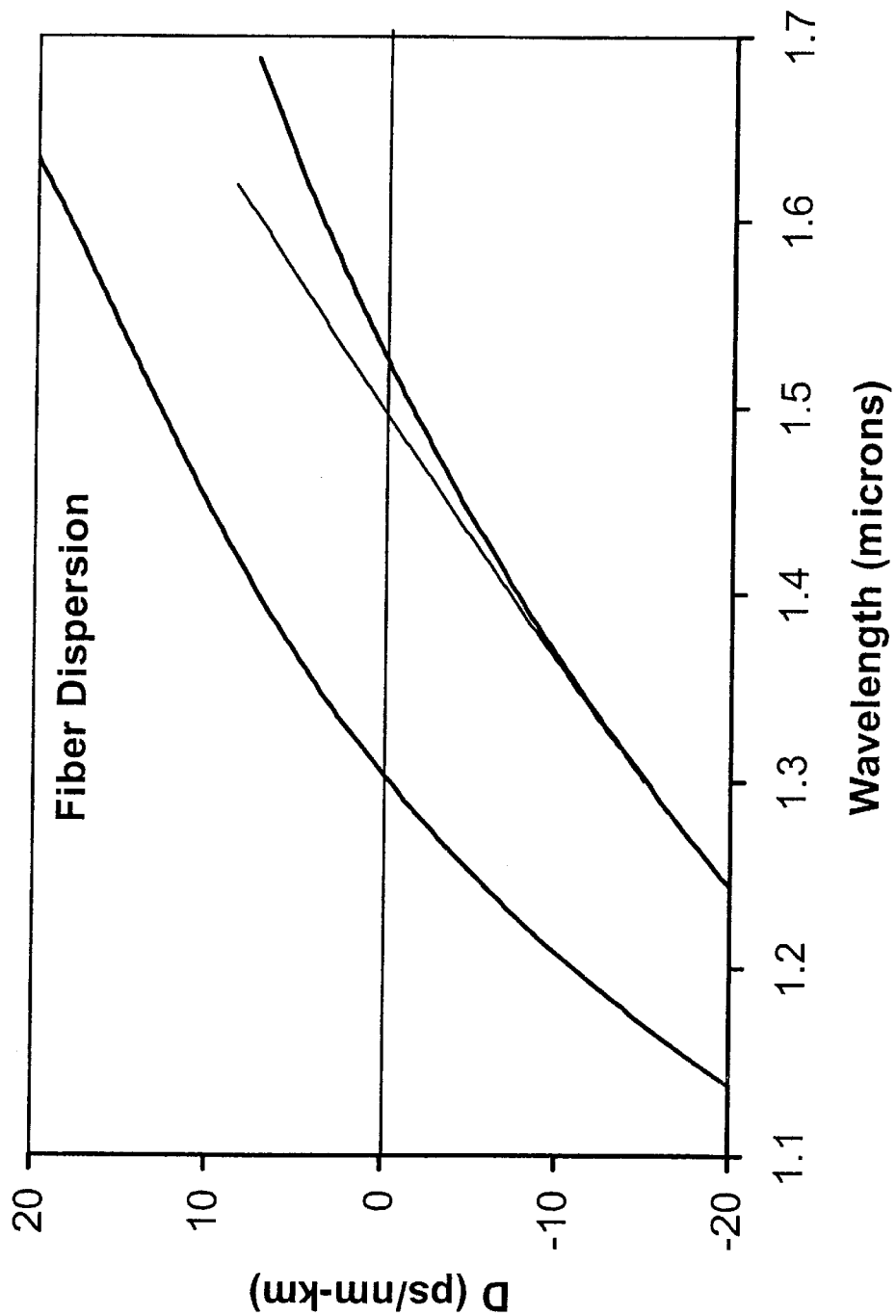
FIG. 1 is a graph of the typical dispersion characteristics of three common commercially available optical fiber types, plotted against wavelength.
Figure 2:
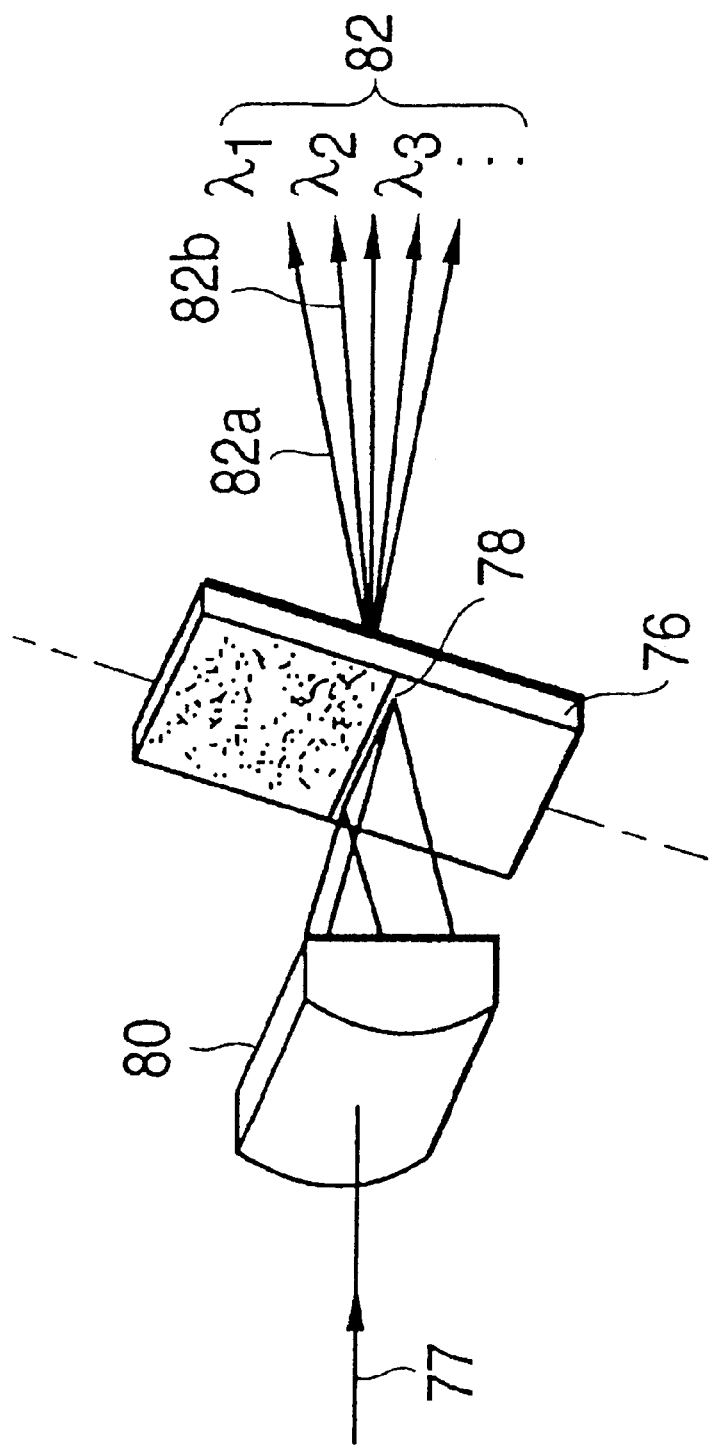
FIG. 2 illustrates a Virtually Imaged Phased Array (VIPA) utilized in the preferred embodiments of a dispersion compensator in accordance with the present invention.

FIG. 2 illustrates a VIPA utilized in the preferred embodiments of the dispersion and dispersion compensator in accordance with the present invention. The VIPA 76 is disclosed in U.S. Pat. No. 5,930,045, incorporated herein by reference. The VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line". Input light 77 radially propagates from focal line 78 to be received inside VIPA 76. The VIPA 76 then outputs a luminous flux 82 of collimated light, where the output angle of luminous flux 82 varies as the wavelength of input light 77 changes. For example, when input light 77 is at a wavelength $\lambda_1$, VIPA 76 outputs a luminous flux 82a at wavelength $\lambda_1$ in a specific direction. When input light 77 is at a wavelength $\lambda_2$, VIPA 76 outputs a luminous flux 82b at wavelength $\lambda_2$ in a different direction. Therefore, VIPA 76 produces luminous fluxes 82a and 82b that are spatially distinguishable from each other.

Figure 3:
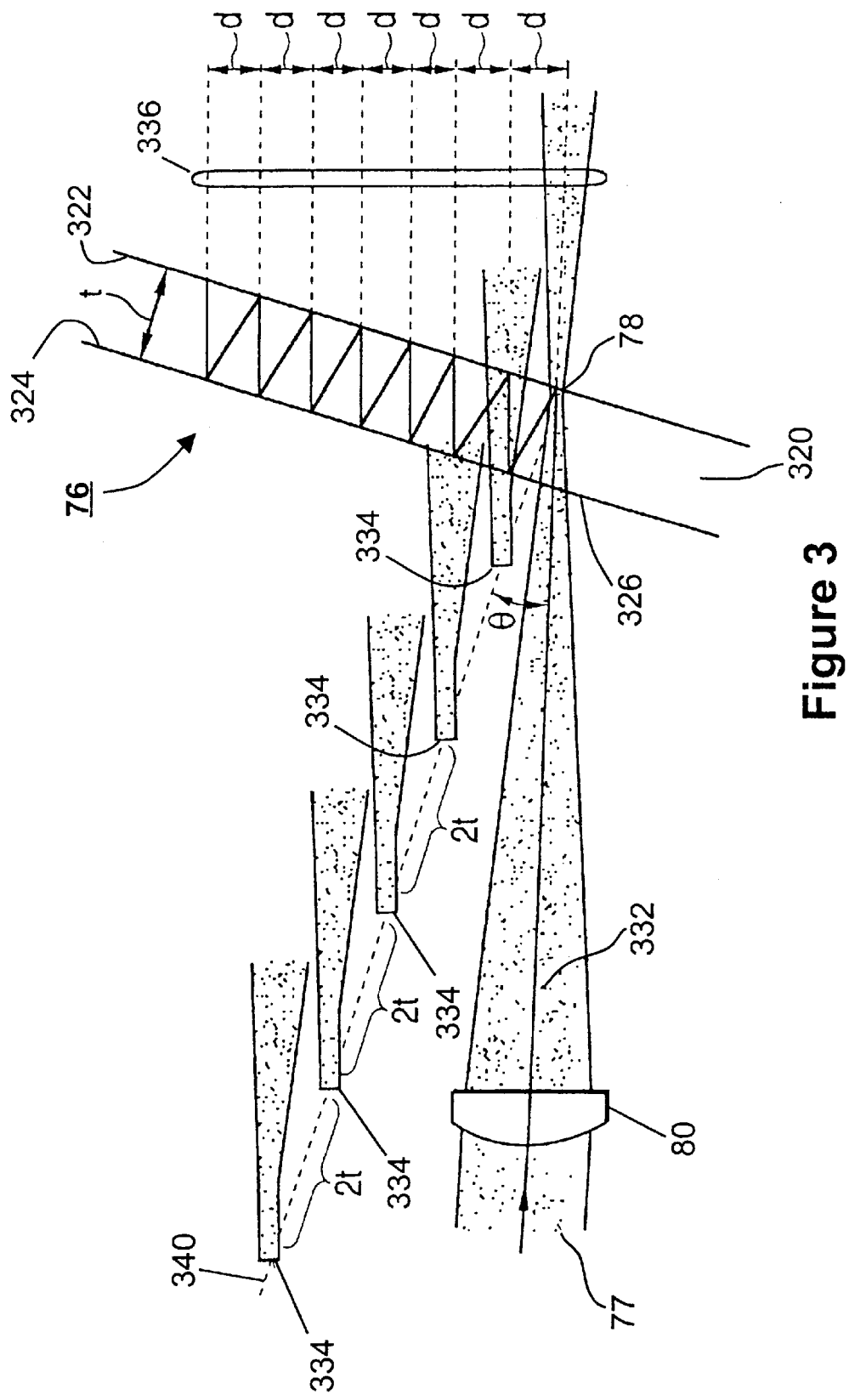
FIG. 3 illustrates in more detail the light path through and operation of the VIPA of FIG. 2.

FIG. 3 illustrates in more detail the VIPA 76 and light paths therein and therethrough. The VIPA 76 includes a plate 320 made of, for example, glass, and having reflecting films 322 and 324 thereon. Reflecting film 322 preferably has a reflectance of approximately 95% or higher, but less than 100%. Reflecting film 324 preferably has a reflectance of approximately 100%. A radiation window 326 is formed on plate 320 and preferably has a reflectance of approximately 0% reflectance.

Input light 77 is focused into focal line 78 by lens 80 through radiation window 326, to subsequently undergo multiple reflection between reflecting films 322 and 324. Focal line 78 is preferably on the surface of plate 320 to which reflecting film 322 is applied. Thus, focal line 78 is essentially line focused onto reflecting film 322 through radiation window 326. The width of focal line 78 can be referred to as the "beam waist" of input light 77 as focused by lens 80. Thus, the VIPA 76 focuses the beam waist of input light 77 onto the far surface (that is, the surface having reflecting film 322 thereon) of plate 320. By focusing the beam waist on the far surface of plate 320, the VIPA 76 reduces the possibility of overlap between (i) the area of radiation window 326 on the surface of plate 320 covered by input light 77 as it travels through radiation window 326 and (ii) the area on reflecting film 324 covered by input light 77 when input light 77 is reflected for the first time by reflecting film 324. It is desirable to reduce such overlap to ensure proper operation of the VIPA 76.

In FIG. 3, an optical axis 332 of input light 77 has a small tilt angle θ with respect to a line 340 perpendicular to the plane of plate 320. Upon the first reflection off of reflecting film 322, 5% of the light passes through reflecting film 322 and diverges after the beam waist, and 95% of the light is reflected towards reflecting film 324. After being reflected by reflecting film 324 for the first time, the light again hits reflecting film 322 but is displaced by an amount d. Then, 5% of the light passes through reflecting film 322. In a similar manner, the light is split into many paths with a constant separation d. The beam shape in each path forms so that the light diverges from virtual images 334 of the beam waist. Virtual images 334 are located with constant spacing 2t along a line 340 that is normal to plate 320, where t is the thickness of plate 320. The positions of the beam waists in virtual images 334 are self-aligned, and there is no need to adjust individual positions. The lights diverging from virtual images 334 interfere with one other and form collimated light 336 which propagates in a direction that changes in accordance with the wavelength of input light 77.

The spacing of light paths is d=2t sin θ, and the difference in the path lengths between adjacent beams is 2t cos θ. The angular dispersion of the VIPA 76 is proportional to the ratio of these two numbers, which is cot θ. As a result, a VIPA 76 produces a significantly large angular dispersion.

Reflecting surfaces 322 and 324 are in parallel with each other and spaced by the thickness t of plate 320 and are typically reflecting films deposited on plate 320. As previously described, reflecting surface 324 has a reflectance of approximately 100%, except in radiation window 326, and reflecting surface 322 has a reflectance of approximately 95% or higher. Therefore, reflecting surface 322 has a transmittance of approximately 5% or less so that approximately 5% or less of light incident on reflecting surface 322 will be transmitted therethrough and approximately 95% or more of the light will be reflected. The reflectances of reflecting surfaces 322 and 324 can easily be changed in accordance with the specific VIPA application. However, generally, reflecting surface 322 should have a reflectance which is less than 100% so that a portion of incident light can be transmitted therethrough. This reflectance need not be constant along the reflecting film 322.

The reflecting surface 324 has radiation window 326 thereon. Radiation window 326 allows light to pass therethrough, and preferably has no reflectance, or a very low reflectance. Radiation window 326 receives input light 77 to allow input light 77 to be received between, and reflected between, reflecting surfaces 322 and 324.

A VIPA 76 has strengthening conditions which are characteristics of the design of the VIPA 76. The strengthening conditions increase the interference of the output lights so that a luminous flux is formed. The strengthening conditions of the VIPA are represented by the following equation:

$$2t \cos \Phi = m\lambda$$

in which Φ indicates the propagation direction of the resulting luminous flux as measured from a line perpendicular to the surface of reflecting surfaces 322 and 324, λ indicates the wavelength of the input light, t indicates the distance between the reflecting surfaces 322 and 324, and m indicates an integer. Therefore, if t is constant and m is assigned a specific value, then the propagation direction Φ of the luminous flux formed for input light having wavelength λ can be determined.

More specifically, input light 77 is radially dispersed from focal line 78 through a specific angle. Therefore, input light having the same wavelength will be traveling in many different directions from focal line 78, to be reflected between reflecting surfaces 322 and 324. The strengthening conditions of the VIPA 76 cause light traveling in a specific direction to be strengthened through interference of the output lights to form a luminous flux having a direction corresponding to the wavelength of the input light. Light traveling in a different direction than the specific direction required by the strengthening condition is weakened by the interference of the output lights.

Figure 4:
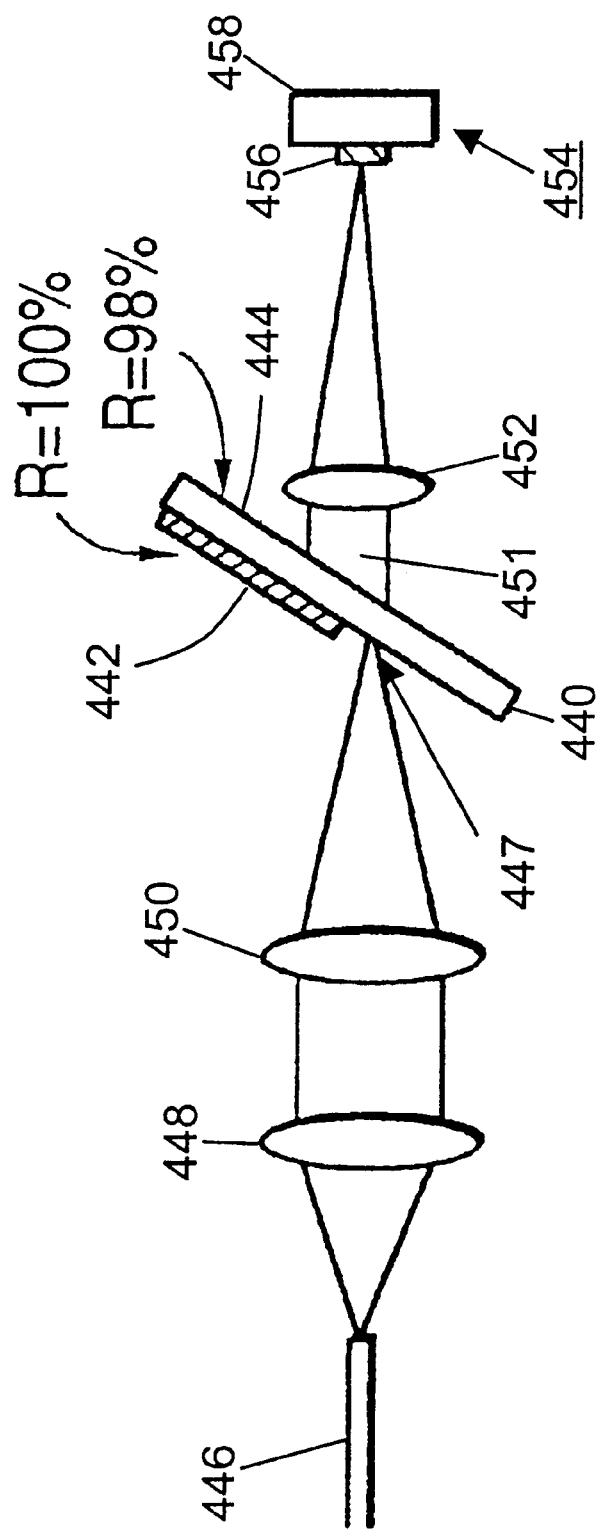
FIG. 4 is a diagram illustrating an apparatus which uses a VIPA and a light returning device to produce chromatic dispersion.

FIG. 4 illustrates an example prior-art apparatus that uses a VIPA as an angular dispersive component to produce chromatic dispersion. A description of this prior-art apparatus will assist in understanding the functioning of the compensator 700 in accordance with the present invention. As illustrated in FIG. 4, a light is output from a fiber 446, collimated by a collimating lens 448 and line-focused into VIPA 440 through radiation window 447 by a cylindrical lens 450. The VIPA 440 then produces a collimated flight 451 which is focused by a focusing lens 452 onto a mirror 454. Mirror 454 can be a mirror portion 456 formed on a substrate 458. Mirror 454 reflects the light back through focusing lens 452 into VIPA 440. The light then undergoes multiple reflections in VIPA 440 and is output from radiation window 447. The light output from radiation window 447 travels through cylindrical lens 450 and collimating lens 448 and is received by fiber 446.

Therefore, light is output from VIPA 440 and reflected by mirror 454 back into VIPA 440. The light reflected by mirror 454 travels through the path which is nearly exactly opposite in direction to the path through which it originally traveled. As described in greater detail herein following, different wavelength components in the light are focused onto different positions on mirror 454, and are reflected back to VIPA 440. As a result, different wavelength components travel different distances, to thereby produce chromatic dispersion.

Figure 5:
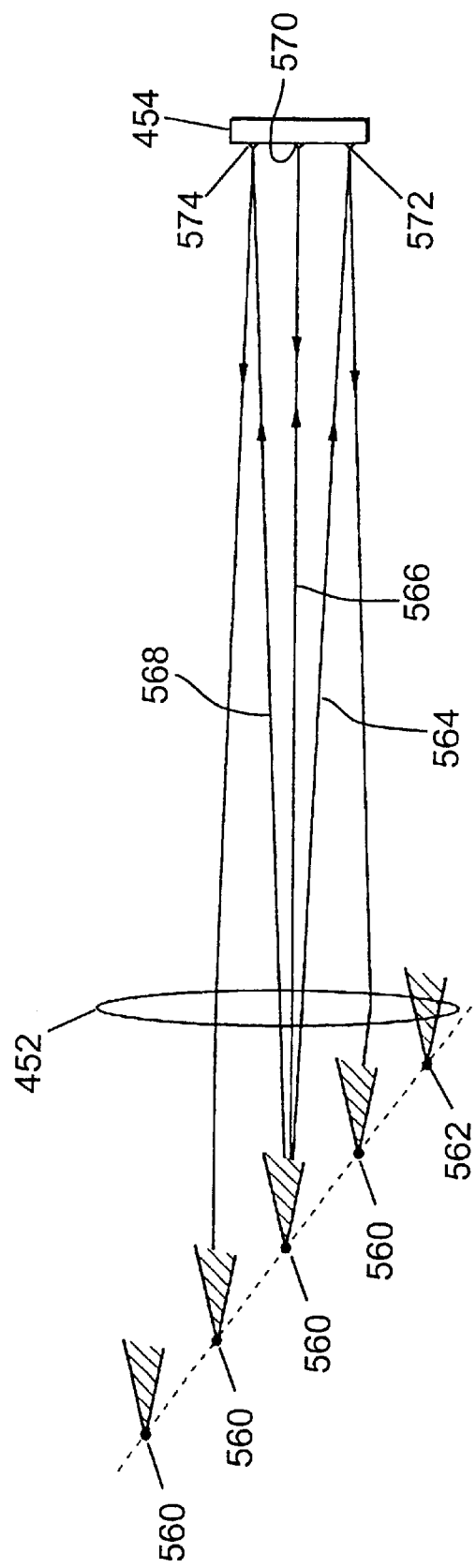
FIG. 5 is a more detailed diagram illustrating the operation of the apparatus in FIG. 4.

FIG. 5 illustrates in more detail the example prior-art apparatus illustrated in FIG. 4. Assume a light having various wavelength components is received by VIPA 440. The VIPA 440 will cause the formation of virtual images 560 of beam waist 562, where each virtual image 560 "emits" light. Focusing lens 452 focuses the different wavelength components in a collimated light from VIPA 440 at different points on mirror 454. More specifically, a longer wavelength 564 focuses at point 572, a center wavelength 566 focuses at point 570, and a shorter wavelength 568 focuses at point 574. Then, longer wavelength 564 returns to a virtual image 560 that is closer to beam waist 562, as compared to center wavelength 566. Shorter wavelength 568 returns to a virtual image 560 that is farther from beam waist 562, as compared to center wavelength 566. Thus, the arrangement provides for normal dispersion.

Mirror 454 is designed to reflect only light in a specific interference order, and light in any other interference order should be focused out of mirror 454. More specifically, as previously described, a VIPA 440 will output a collimated light. This collimated light will travel in a direction such that the optical path length difference between subsequent virtual images contributing to the collimated light is $m\lambda$, where m is an integer. The $m^{th}$ order of interference is defined as an output light corresponding to m. Each order comprises a plurality of wavelength components and the wavelength components of one order are repeated in any other order. However, collimated lights at the same wavelength for different interference orders generally travel in different directions and are therefore focused at different positions. Thus, the mirror 454 can be made to reflect only light from a single interference order back into VIPA 440.

A wavelength division multiplexed light usually includes many channels, wherein each channel has a center wavelength and the center wavelengths are usually spaced apart by a constant frequency spacing. If the thickness t between first and second surfaces 442 and 444 of VIPA 440 is set at a specific value, the arrangement will be able to simultaneously compensate for dispersion in each channel. The thickness t which permits such simultaneous dispersion compensation is such that all of the wavelength components corresponding to the center wavelengths have the same output angle from VIPA 440 and thus the same focusing position on mirror 454. This is possible when the thickness t is set so that, for each channel, the round-trip optical length through VIPA 440 traveled by the wavelength component corresponding to the center wavelength is a multiple of the center wavelength of each channel, that is, t is such that the quantity $2\ nt \cos \theta$ is an integer multiple of the center wavelength of each channel. This amount of thickness t will hereafter be referred to as the "WDM matching free spectral range thickness", or "WDM matching FSR thickness".

Therefore, in FIG. 5, with the thickness t set to the WDM matching FSR thickness, VIPA 440 and focusing lens 452 will cause (a) the wavelength component corresponding to the center wavelength of each channel to be focused at point 570 on mirror 454, (b) the wavelength component corresponding to the longer wavelength component of each channel to be focused at point 572 on mirror 454, and (c) the wavelength component corresponding to the shorter wavelength component of each channel to be focused at point 574 on mirror 454. Therefore, VIPA 440 can be used to compensate for chromatic dispersion in all channels of a wavelength division multiplexed light. However, this prior-art VIPA-based dispersion-compensating apparatus does not compensate for dispersion slope or PMD.

Figure 6A:
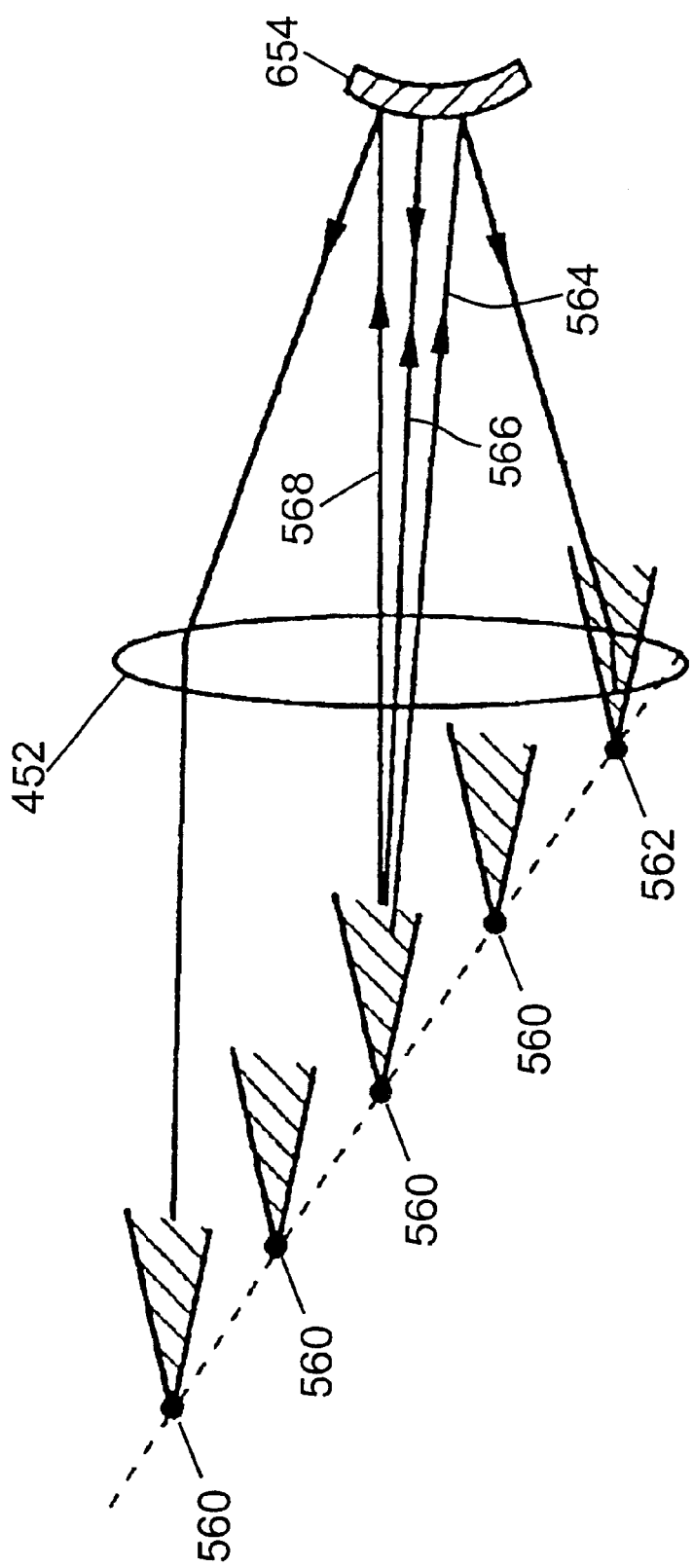
FIGS. 6a and 6b are diagrams illustrating side views of an apparatus which uses a VIPA together with a curved light reflecting apparatus so as to provide, respectively, negative and positive chromatic dispersion to light.
Figure 6B:
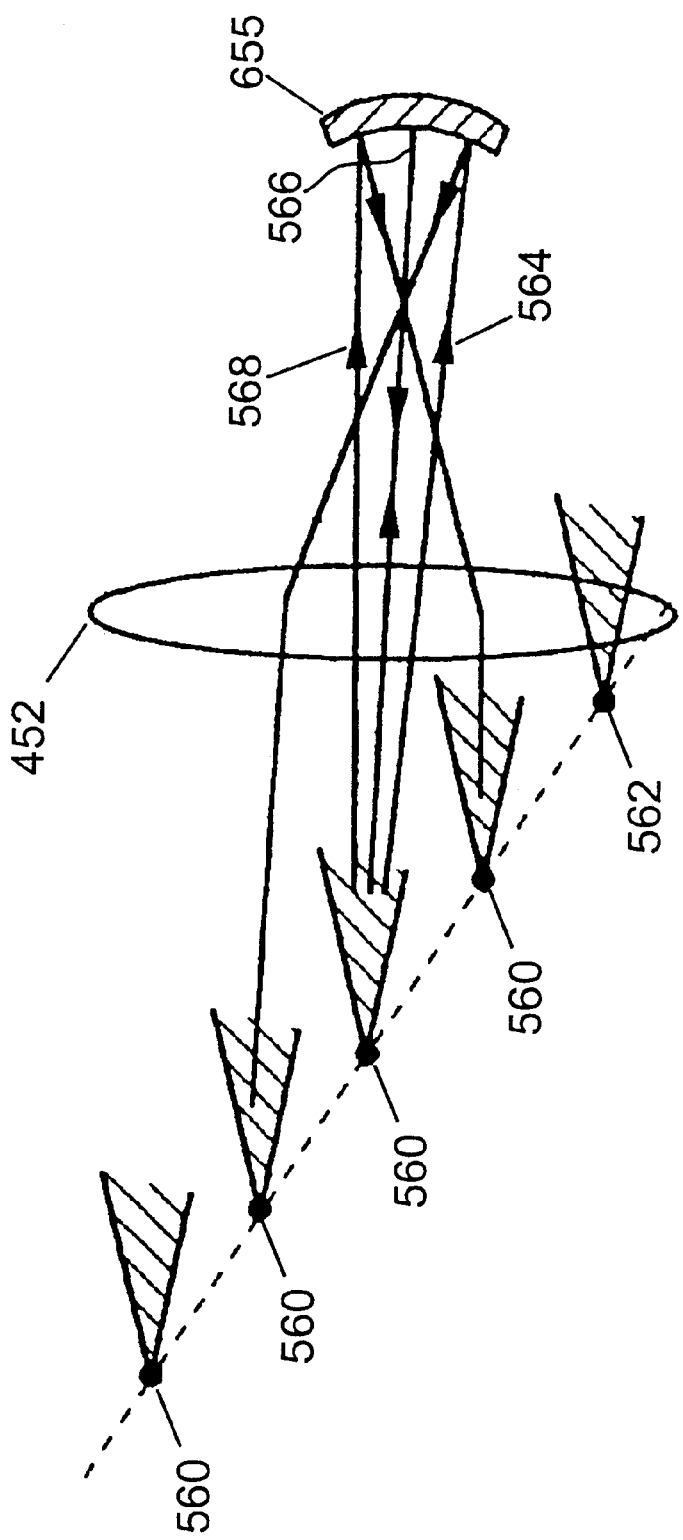

FIGS. 6a and 6b illustrate additional example prior-art apparatuses which use a VIPA to provide various values of chromatic dispersion to light. In FIGS. 6a and 6b, there are illustrated the travel directions of a longer wavelength 564, a center wavelength 566 and a shorter wavelength 568 of light emitted by a virtual image 560 of beam waist 562. The mirror 654 and the mirror 655 are located at or near the focal point of focusing lens 452. In FIG. 6a, mirror 654 is a convex mirror. With a convex mirror, the beam shift is magnified relative to that produced by a flat mirror. Therefore, a large chromatic dispersion can be obtained with a short lens focal length and a small amount of space. In FIG. 6b, mirror 655 is a concave mirror. With a concave mirror, the sign of the dispersion is inverted relative to that produced by a flat mirror.

With either a flat mirror 454 (FIG. 5) or a convex mirror 654 (FIG. 6a), the light of longer ("red") wavelengths of an optical signal travels a shorter round trip distance through the apparatus then does the light of shorter ("blue") wavelengths of said signal. Thus, negative chromatic dispersion is introduced into the signal. This form of apparatus is useful for compensating accumulated positive chromatic dispersion in an optical signal. With a concave mirror 655 (FIG. 6b), the light of "red" wavelengths of an optical signal travels a greater distance through the apparatus then does the light of "blue" wavelengths of said signal and, thus, positive chromatic dispersion is introduced into the signal. This latter form of apparatus is useful for compensating accumulated negative chromatic dispersion in an optical signal.

FIGS. 7a and 7b illustrate a top-view and side-view, respectively, of a first preferred embodiment of a dispersion compensator in accordance with the present invention. The compensator 700 comprises a fiber 702, a collimator lens 703, a cylindrical lens 704, a VIPA 706 of which the thickness is equal to the WDM matching FSR thickness, a diffraction grating 710, a birefringent wedge 720, a focusing lens 712, and a first and second mirror 714a–714b. A wavelength-division multiplexed composite signal 701 is output from fiber 702, is collimated by collimator lens 703 and is then brought to a line focus at the beam waist 705 of VIPA 706 by the cylindrical lens 704. The channels 707 and 708 are two representative channels of the composite optical signal 701. As discussed previously, the VIPA 706 spatially disperses the wavelengths comprising each one of the channels of composite signal 701, such that rays of each wavelength emanate from the VIPA 706 along ray paths which are parallel to one another but of a different direction than rays of any other wavelength comprising each channel. Upon passing through and exiting the VIPA 706, the wavelengths comprising each of these channels are separated and dispersed within a vertical dispersion plane. For instance, the wavelengths of first and second channels, 707 and 708, respectively, are separated into relatively longer wavelengths 707a and 708a and relatively shorter wavelengths, 707b and 708b, respectively, together with respective continua of intervening wavelengths. Because the thickness of the VIPA 706 is equal to the WDM matching FSR thickness, then, immediately upon exiting the VIPA 706, the path of wavelength 707a overlaps that of wavelength 708a and the path of wavelength 707b overlaps that of wavelength 708b.

After exiting the VIPA 706, the wavelengths comprising each channel are separated and dispersed from one another within a horizontal dispersion plane by the transmission grating 710. The paths of the various signals are spatially dispersed from one another according to their respective wavelengths. The dispersion plane of transmission grating 710 is not parallel to that of the VIPA 706, however. Instead, these two dispersion planes are perpendicular to one another. Thus, as shown in FIG. 7a, the dispersion plane of transmission grating 710 is horizontal and, upon emerging from this grating, the wavelengths comprising the first channel 707 are output along a different horizontal direction from those of the second channel 708. The path of the relatively longer wavelength 707a of the first channel 707 is separated within a horizontal plane from that of the relatively longer wavelength 708a of the second channel 708. In similar fashion, the relatively shorter wavelengths 707b, 708b of each channel are spatially dispersed within a horizontal plane. These twice dispersed wavelengths of the plurality of channels then pass through the birefringent wedge 720 which spatially separates each such wavelength into a first and second rays of mutually orthogonal polarizations. The less-deflected horizontally polarized rays comprise the rays 707ah, 708ah, 707bh and 708bh and the more-greatly-deflected vertically polarized rays comprise the rays 707bv, 708bv, 707av and 708av. Both the horizontally polarized and the vertically polarized rays pass through and are focused by lens 712, which focuses them onto upper mirror 714a and lower mirror 714b, respectively.

Figure 7C:
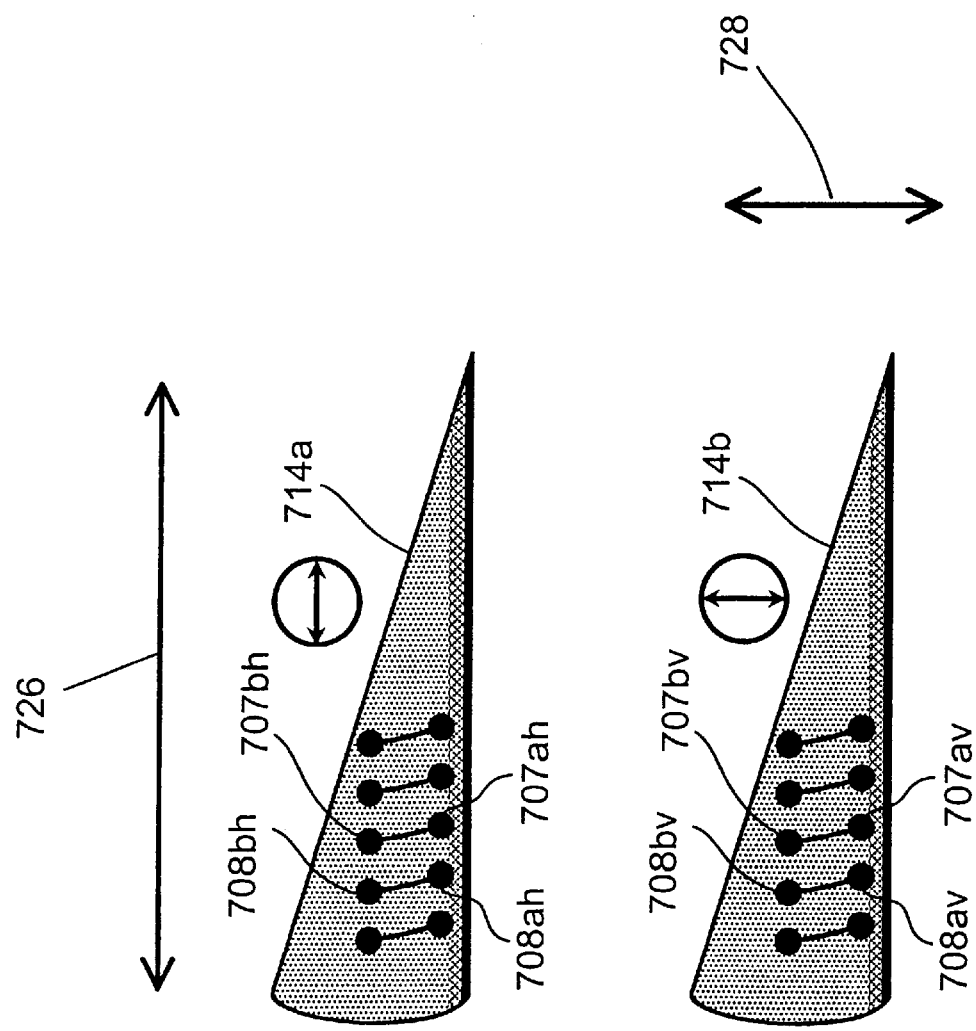
FIG. 7c is a perspective view showing the locations of the focused wavelengths of the various channels upon the mirrors of the first preferred embodiment of the compensator in accordance with the present invention.

FIG. 7c provides a perspective view of the focused wavelengths of the various channels of composite optical signal 701 upon the mirrors 714a and 714b of the first preferred embodiment of the compensator in accordance with the present invention. Preferably, each of these mirrors is shaped as a curved conical mirror. Chromatic dispersion is adjusted by simultaneous movement of both mirrors 714a–714b along the adjustment direction 726 and PMD dispersion is adjusted by movement of one of the mirrors 714a–714b along the adjustment direction 728.

The mirrors 714a–714b reflect the wavelengths of the channels comprising the composite optical signal 701 back through the various components of the compensator 700 so as to be recombined into channels at birefringent wedge 720 and into a dispersion compensated composite optical signal at transmission grating 710 and VIPA 706. Compensatory dispersion is introduced into the return signal by virtue of the fact that different wavelengths "return" to different virtual images of the beam waist 705 within VIPA 706 as previously described. The degree of chromatic dispersion introduced into any channel is determined by the curvature of the mirrors at the locations where the channel is reflected. The degree of introduced chromatic dispersion slope is determined by the change in curvature of the mirrors along adjustment direction 726. The degree of PMD introduced into any channel is determined by the difference in reflection angle between the horizontally polarized rays as reflected off mirror 714a and the vertically polarized rays as reflected off mirror 714b. This difference is controlled by motion of one of the mirrors 714a–714b along the adjustment direction 728.

FIGS. 8a–8b illustrate a top-view and side-view, respectively, of a second preferred embodiment of a dispersion compensator in accordance with the present invention. The compensator 800 is similar in construction and operation to the compensator 700 except that the single birefringent wedge 720 and the single focusing lens 712 comprising compensator 700 are respectively replaced by the two birefringent wedges 820a–820b and the two focusing lenses 812a–812b in the compensator 800. One of ordinary skill in the art will recognize that the two birefringent wedges 820a–820b may be replaced by a single birefringent plate. The configuration of elements in the compensator 800 permits each lens/mirror assembly 824a–824b to be adjusted independently of the other along adjustment direction 830. This adjustment along the adjustment direction 830 provides an additional means of compensating PMD by causing a difference between the physical path lengths of horizontally polarized rays 807ah, 807bh, 808ah, and 808bh and of vertically polarized rays 807av, 807bv, 808av and 808bv. PMD compensation may also be varied in the compensator 800 by adjusting one or more of the mirrors 714a–714b according to adjustment direction 728.

FIGS. 9a–9b illustrate a top view and side view, respectively, of a third preferred embodiment of a dispersion compensator in accordance with the present invention. Like the compensator 700, the compensator 900 simultaneously introduces dispersion into optical channels so as to compensate for chromatic dispersion, chromatic dispersion slope and PMD. However, the compensator 900 differs from the compensator 700 through the substitution of two parallel transmission gratings 910a–910b for the single transmission grating 710 and the optional addition of a beam condenser 916 comprising two lenses 917a–917b.

The parallel transmission gratings 910a–910b of compensator 900 cause the dispersed wavelengths of all channels to propagate parallel to one another in top-view projection after emerging from the grating pair. The wavelengths 907a and 907b represent relatively longer and shorter wavelengths of a first such channel; the wavelengths 908a, and 908b represent relatively longer and shorter wavelengths of a second such channel. Because of the parallelism of the gratings 910a–910b, the two mirrors 914a–914b do not necessarily require the curved conical shape of the mirrors 714a–714b. In the third preferred embodiment, the mirrors 914a–914b comprise simple conical shapes, although numerous other shapes are possible. Optionally, the separations between the channels are then condensed along a horizontal dimension perpendicular to the main axis by the two cylindrical lenses 917a–917b comprising beam condenser 916. Thus, the degree of chromatic dispersion slope compensation may be controlled by adjustment of the beam condenser 916. The horizontally polarized rays 907ah, 907bh, 908ah, 908bh and the vertically polarized rays 907av, 907bv, 908av, 908bv of two representative channels are then focused by lens 912 onto first mirror 914a and second mirror 914b, respectively. In other aspects, the operation of the compensator 900 is similar to that of the compensator 700.

Figure 10A:
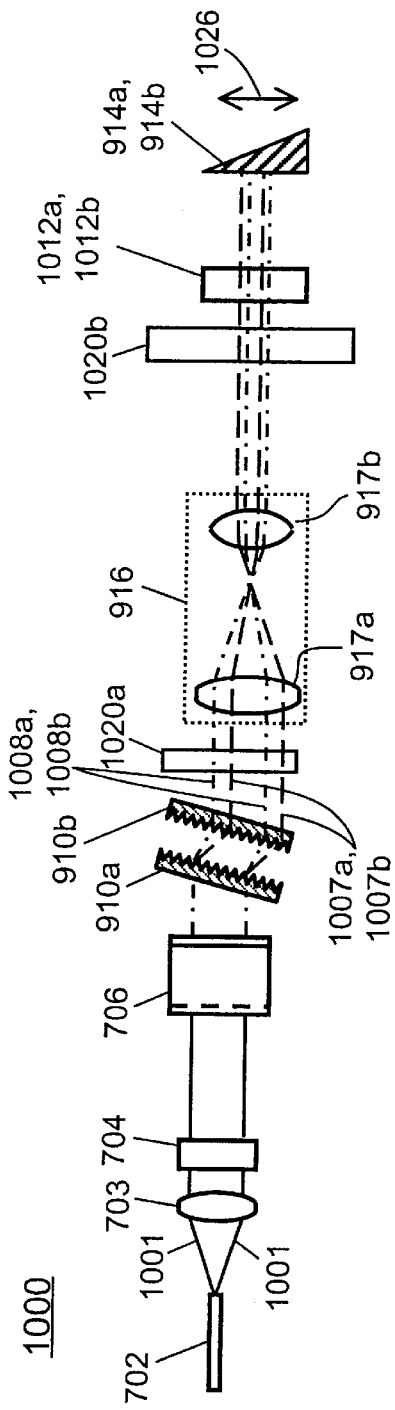
FIGS. 10a and 10b illustrate a top-view and side-view, respectively, of a fourth preferred embodiment of a dispersion compensator in accordance with the present invention.
Figure 10B:
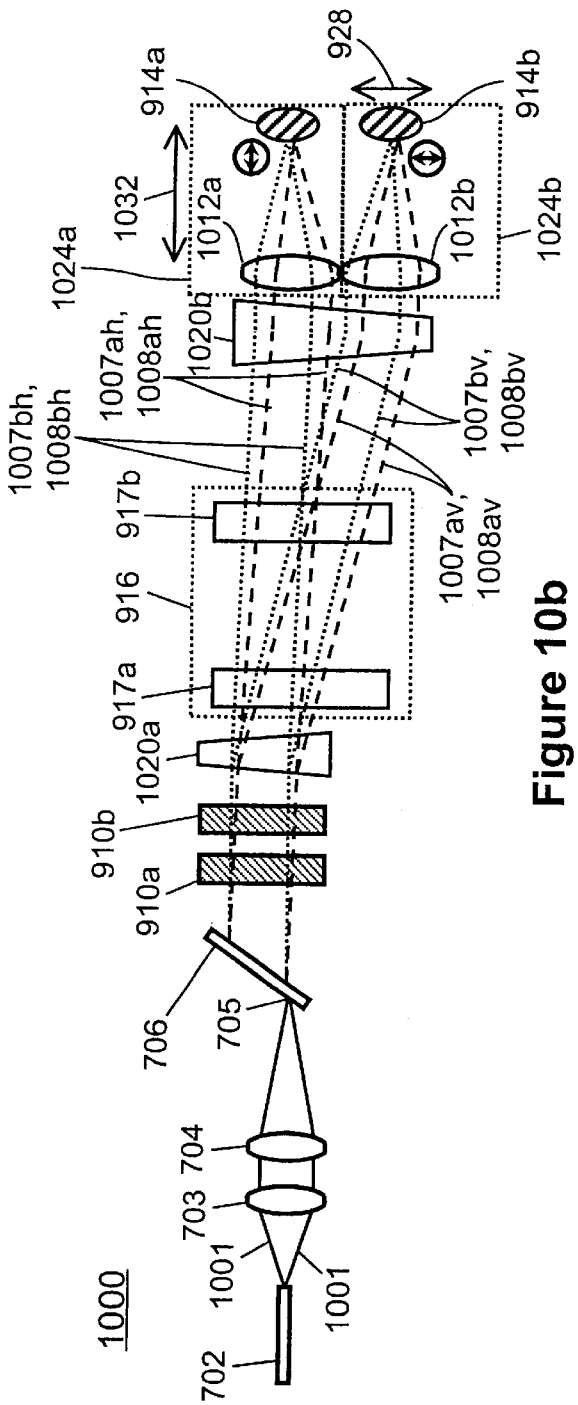

FIGS. 10a–10b illustrate a top view and side view, respectively, of a fourth preferred embodiment of a dispersion compensator in accordance with the present invention. The compensator 1000 is similar in construction and operation to the compensator 900 except that the single birefringent wedge 920 and the single focusing lens 912 comprising compensator 900 are respectively replaced by the two birefringent wedges 1020l–1020b and the two focusing lenses 1012a–1012b in the compensator 1000. The configuration of elements in the compensator 1000 permits each lens/mirror assembly 1024a–1024b to be adjusted independently of the other along adjustment direction 1032. This adjustment along the adjustment direction 1032 provides an additional means of compensating PMD by causing a difference between the physical path lengths of horizontally polarized rays 1007*ah*, 1007*bh*, 1008*ah*, and 1108*bh* and of vertically polarized rays 1007*av*, 1007*bv*, 1008*av* and 1008*bv*. As in the compensator 900, PMD compensation may also be varied in the compensator 1000 by adjusting one or more of the mirrors 1014*a*–1014*b* according to adjustment direction 928.

Figure 11:
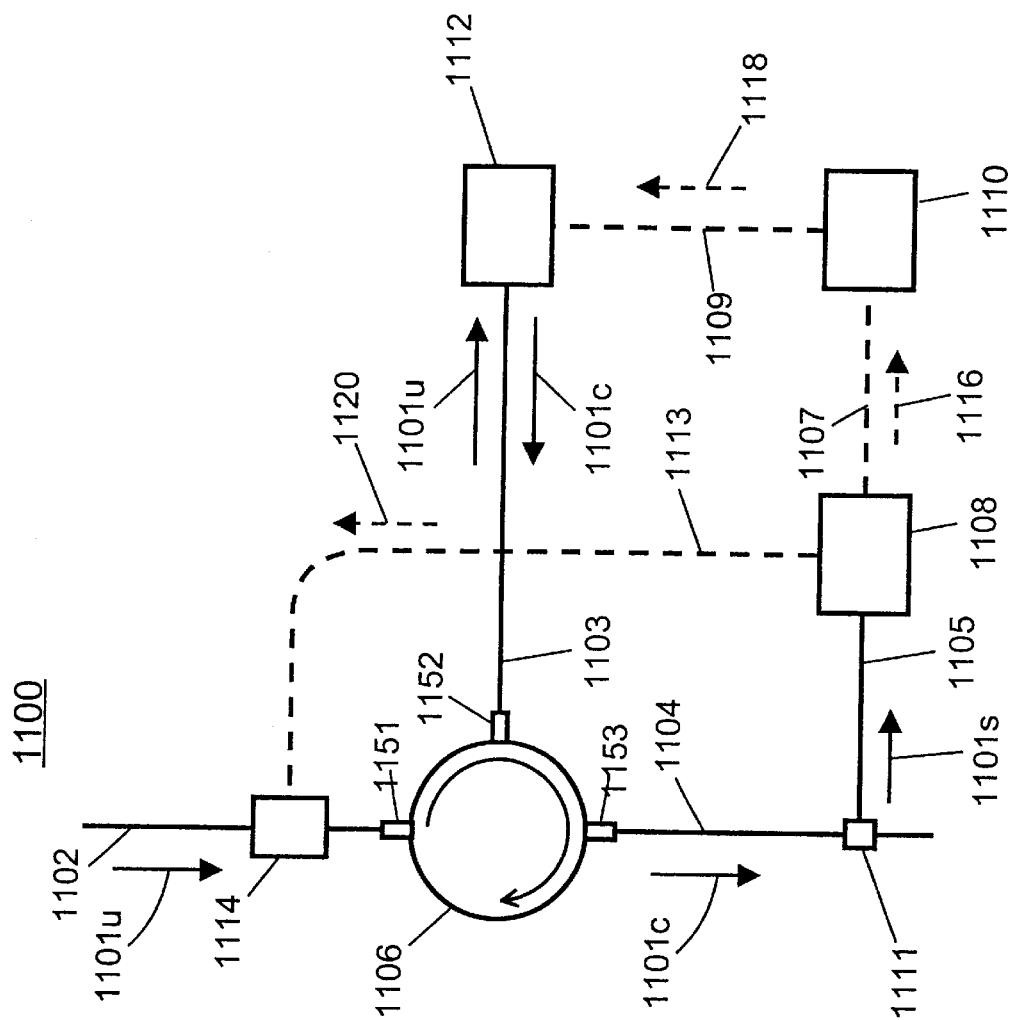
FIG. 11 illustrates a preferred embodiment of a system which utilizes a dispersion compensator in accordance with the present invention.

FIG. 11 illustrates a preferred embodiment of a system which utilizes the dispersion compensator in accordance with the present invention. The system 1100 comprises an input fiber optic line 1102, an optical tap 1111, a dispersion analyzer 1108, a compensator controller 1110, a dispersion compensator 1112, a polarization controller 1114, an optical circulator 1106 and an output fiber optic line 1104. The input line 1102 and output line 1104 are optically coupled to the port 1151 and to the port 1153 of circulator 1106, respectively. The system 1100 further comprises a fiber optic tap line 1105 optically coupling the optical tap 1111 to the dispersion analyzer 1108 and a fiber optic line 1103 optically coupling the dispersion compensator 1112 to port 1152 of the circulator 1106. The system further comprises first 1107 and second 1109 electronic signal or control lines respectively connected between the dispersion analyzer 1108 and the controller 1110 and between the controller 1110 and the dispersion compensator 1112. The system further comprises a third electronic signal or control line 1113 connected between the dispersion analyzer 1108 and the polarization controller 1114. The polarization controller 1114 may be one of several well-known types, such as a looped fiber device, an optical wave plate device, or an electronic liquid crystal device. The polarization controller 1114 serves to convert or rotate the polarization state of incoming uncompensated signal light into a polarization state compatible with the birefringent elements of the compensator 1112 so as to provide optimal PMD compensation. The fiber optic line 1103 preferably comprises a polarization-preserving fiber.

An uncompensated optical signal or composite optical signal 1101*u* is input to the system 1100 via the input fiber optic line 1102. The uncompensated signal 1101*u* comprises unwanted chromatic dispersion and PMD that is to be compensated by the system 1100. The uncompensated optical signal or composite signal 1101*u* passes through the polarization controller 1114 to the port 1151 of the optical circulator 1106. The optical circulator 1106 directs signal 1101*u* to its port 1152, from which it is immediately output to the fiber optic line 1103 and input to the dispersion compensator 1112. The dispersion compensator 1112 comprises one of the dispersion compensator embodiments in accordance with the present invention.

As described previously herein, the dispersion compensator 1112 provides compensatory chromatic dispersion, dispersion slope, and PMD to the uncompensated optical signal or composite optical signal 1101*u* so as to output the compensated signal or composite optical signal 1101*c*. The compensated signal 1101*c* is output along the optical fiber line 1103 in the opposite direction from the input signal 1101*u*. The compensated signal is then input to optical circulator 1106 through its port 1152. By the well-known operation of optical circulators, the compensated signal 1101*c* is directed to the port 1153 of optical circulator 1106, from which it is immediately output to the output fiber optic line 1104. A small portion 1101*s* of the compensated output signal 1101*c* is split off from signal 1101*c* by the optical tap 1111 and diverted to the dispersion analyzer via the fiber optic tap line 1105.

The dispersion compensator 1112 is controlled by electronic signal 1118 output from controller 1110 along electronic line 1109. The controller 1110 generates control signals in response to an electronic signal or signals 1116 produced by dispersion analyzer 1108 and sent to the controller 1110 along electronic line 1107. The dispersion analyzer may comprise separate known components to analyze chromatic dispersion and PMD, such as an optical spectrum analyzer and an ellipsometer, respectively. The electronic signal(s) 1116 contains information measured by the dispersion analyzer 1108 and pertaining to the magnitude and sign of chromatic dispersion and PMD carried by the sample signal 1101*s*. By logical extension, these quantities also relate to the signal 1101*u*. In response to these measurements, the dispersion analyzer 1108 outputs a first electronic signal 1116 to controller 1110 along electronic line 1107 and, optionally, outputs a second electronic signal 1120 to the polarization controller along electronic line 1113.

The amount of compensatory dispersion provided by dispersion compensator 1112 is controlled by the electronic signal 1118 output from the controller 1110 in response to the dispersion characteristics measured by dispersion analyzer 1108. Adjusting one or more of the various optical components along its respective adjustment direction, as described previously herein, causes variation in the magnitude and sign of the compensatory dispersion. It may be necessary to separate and or rotate the polarization components of the uncompensated signal 1101*u*, prior to input to the dispersion compensator 1112. The polarization controller 1114 performs these polarization separation and rotation functions.

A dispersion compensator which utilizes a Virtually Imaged Phased Array (VIPA), gratings, and birefringent wedges to moderate chromatic dispersion, dispersion slope and polarization mode dispersion has been disclosed. The dispersion compensator in accordance with the present invention provides simultaneous tunable compensation of these various dispersions utilizing a single apparatus. A system which utilizes the compensator is thus cost effective to manufacture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for dispersion compensation for a composite optical signal in an optical fiber transmission system, the composite optical signal comprising a plurality of channels, each of the plurality of channels comprising a band of wavelengths, wherein the bands of wavelengths comprises unwanted chromatic dispersion, dispersion slope, and polarization mode dispersion (PMD), comprising the steps of:

(a) propagating the composite optical signal in a forward direction;

(b) separating the wavelengths in the band of wavelengths in each of the plurality of channels, wherein each of the wavelengths in the band is spatially distinguishable from the other wavelengths in the band;

(c) spatially separating each band of wavelengths in the plurality of channels;

(d) spatially separating each wavelength of each separated band of wavelengths into a plurality of polarized rays; and (e) reflecting the plurality of polarized rays toward a return direction, wherein dispersion is added to the reflected plurality of polarized rays such that the unwanted chromatic dispersion, dispersion slope, and PMD are compensated.

2. The method of claim 1, wherein the spatially separating step (d) comprises:
(d1) spatially separating each wavelength of each band of wavelengths into a first polarized ray and a second polarized ray, wherein a polarization plane orientation of the first and second polarized rays are mutually orthogonal.

3. The method of claim 1, wherein in the reflecting step (e), each of the plurality of polarized rays intercepts at least one mirror at a different position.

4. A method for dispersion compensation for a composite optical signal in an optical fiber transmission system, the composite optical signal comprising a plurality of channels, each of the plurality of channels comprising a band of wavelengths, wherein the bands of wavelengths comprises unwanted chromatic dispersion, dispersion slope, and polarization mode dispersion (PMD), comprising the steps of:
(a) propagating the composite optical signal in a forward direction;
(b) separating the wavelengths in the band of wavelengths in each of the plurality of channels, wherein each of the wavelengths in the band is spatially distinguishable from the other wavelengths in the band;
(c) spatially separating each band of wavelengths in the plurality of channels, wherein the spatially separating step (c) further comprises:
(c1) compressing the spatially separated bands of wavelengths along a single dimension;
(d) spatially separating each wavelength of each separated band of wavelengths into a plurality of polarized rays; and
(e) reflecting the plurality of polarized rays toward a return direction, wherein dispersion is added to the reflected plurality of polarized rays such that the unwanted chromatic dispersion, dispersion slope, and PMD are compensated.

5. A method for dispersion compensation for a composite optical signal in an optical fiber transmission system, the composite optical signal comprising a plurality of channels, each of the plurality of channels comprising a band of wavelengths, wherein the bands of wavelengths comprises unwanted chromatic dispersion, dispersion slope, and polarization mode dispersion (PMD), comprising the steps of:
(a) propagating the composite optical signal in a forward direction;
(b) separating the wavelengths in the band of wavelengths in each of the plurality of channels, wherein each of the wavelengths in the band is spatially distinguishable from the other wavelengths in the band;
(c) spatially separating each band of wavelengths in the plurality of channels;
(d) spatially separating each wavelength of each separated band of wavelengths into a plurality of polarized rays; and
(e) reflecting the plurality of polarized rays toward a return direction, wherein dispersion is added to the reflected plurality of polarized rays such that the unwanted chromatic dispersion, dispersion slope, and PMD are compensated, wherein in the reflecting step (e), each of the plurality of polarized rays intercepts at least one mirror at a different position, wherein a first polarized ray intercepts a first mirror and a second polarized ray intercepts a second mirror.

6. A dispersion compensator, comprising:
a Virtually Imaged Phased Array (VIPA) optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
at least one diffraction grating, wherein a first side of the at least one diffraction grating is optically coupled to a second side of the VIPA;
at least one birefringent wedge, wherein a first side of the at least one birefringent wedge is optically coupled to a second side of the at least one diffraction grating;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of spatially separated bands of wavelengths toward a return direction, wherein dispersion is added to the reflected plurality of polarized rays such that the unwanted chromatic dispersion, dispersion slope, and PMD are compensated.

7. The compensator of claim 6, wherein the VIPA separates the wavelengths in a band of wavelengths in each of a plurality of channels, wherein each of the wavelengths in the band is spatially distinguishable from the other wavelengths in the band.

8. The compensator of claim 6, wherein the at least one diffraction grating spatially separates each band of wavelengths in the plurality of channels traversing through the at least one diffraction grating in the forward direction.

9. The compensator of claim 6, wherein the at least one birefringent wedge spatially separates each wavelength of each band of wavelengths traversing through the at least one birefringent wedge in the forward direction into the plurality of polarized rays.

10. The compensator of claim 9, wherein each wavelength is separated into the plurality of polarized rays within a vertical plane.

11. The compensator of claim 9, wherein each wavelength is separated into the plurality of polarized rays within a horizontal plane.

12. The compensator of claim 6, wherein the at least one diffraction grating comprises:
a first diffraction grating, wherein a first side of the first diffracting grating is optically coupled to the second side of the VIPA; and
a second diffraction grating, wherein a first side of the second diffraction grating is optically coupled to a second side of the first diffraction grating, wherein a second side of the second diffraction grating is optically coupled to the first side of the at least one birefringent wedge.

13. The compensator of claim 6, wherein the at least one birefringent wedge comprises:
a first birefringent wedge, wherein a first side of the first birefringent wedge is optically coupled to the second side of the at least one diffraction grating; and
a second birefringent wedge, wherein a first side of the second birefringent wedge is optically coupled to a second side of the first birefringent wedge, wherein a second side of the second birefringent wedge is optically coupled to the first side of the at least one focusing lens.

14. The compensator of claim 13, further comprising:
a beam condenser optically coupled between the first birefringent wedge and the second birefringent wedge.

15. The compensator of claim 6, wherein the at least one focusing lens comprises:
a first focusing lens, wherein a first side of the first focusing lens is optically coupled to the second side of the at least one birefringent wedge and a second side of the first focusing lens is optically coupled to the at least one mirror; and
a second focusing lens, wherein a first side of the second focusing lens is optically coupled to the second side of the at least one birefringent wedge and a second side of the second focusing lens is optically coupled to the at least one mirror.

16. The compensator of claim 6, wherein the at least one mirror comprises a flat surface.

17. The compensator of claim 6, wherein the at least one mirror comprises a cylindrical concave surface.

18. The compensator of claim 6, wherein the at least one mirror comprises a cylindrical convex surface.

19. The compensator of claim 6, wherein the at least one mirror is adjustable in a vertical direction, wherein a vertical adjustment varies an amount of dispersion added.

20. The compensator of claim 6, wherein the at least one mirror is adjustable in a horizontal direction, wherein a horizontal adjustment varies an amount of dispersion added.

21. The compensator of claim 6, wherein the at least one mirror is rotationally adjustable, wherein a rotational adjustment varies an amount of dispersion added.

22. The compensator of claim 6, further comprising:
a beam condenser optically coupled between the at least one birefringent wedge and the at least one focusing lens.

23. A dispersion compensator, comprising:
a Virtually Imaged Phased Array (VIPA) optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
at least one diffraction grating, wherein a first side of the at least one diffraction grating is optically coupled to a second side of the VIPA;
at least one birefringent wedge, wherein a first side of the at least one birefringent wedge is optically coupled to a second side of the at least one diffraction grating;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of spatially separated bands of wavelengths toward a return direction, wherein dispersion is added to the reflected plurality of polarized rays such that the unwanted chromatic dispersion, dispersion slope, and PMD are compensated, wherein the at least one mirror comprises:
a first mirror optically coupled to the second side of the at least one focusing lens, and
a second mirror optically coupled to the second side of the at least one focusing lens.

24. The compensator of claim 23, wherein the first mirror reflects a first polarized ray and the second mirror reflects a second polarized ray, wherein a polarization plane orientation of the first and second polarized rays are mutually orthogonal.

25. A dispersion compensator, comprising:
a VIPA optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
a diffraction grating, wherein a first side of the diffraction grating is optically coupled to a second side of the VIPA;
a first birefingent wedge, wherein a first side of the first birefringent wedge is optically coupled to a second side of the diffraction grating;
a second birefringent wedge, wherein a first side of the second birefringent wedge is optically coupled to a second side of the first birefringent wedge;
a first focusing lens, wherein a first side of the first focusing lens is optically coupled to a second side of the second birefringent wedge;
a second focusing lens, wherein a first side of the second focusing lens is optically coupled to the second side of the second birefringent wedge;
a first mirror optically coupled to a second side of the first focusing lens, wherein the first mirror reflects a first polarized ray of each wavelength of each spatially separated band of wavelengths toward a return direction; and
a second mirror optically coupled to a second side of the second focusing lens, wherein the second mirror reflects a second polarized ray of each wavelength of each spatially separated band of wavelengths toward a return direction, wherein a polarization plane orientation of the first and second polarized rays are mutually orthogonal, wherein dispersion is added to the reflected plurality of polarized rays such that the unwanted chromatic dispersion, dispersion slope, and PMD are compensated.

26. A dispersion compensator, comprising:
a VIPA optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
a first diffraction grating, wherein a first side of the first diffraction grating is optically coupled to a second side of the VIPA;
a second diffraction grating, wherein a first side of the second diffraction grating is optically coupled to a second side of the first diffraction grating;

a birefringent wedge, wherein a first side of the birefringent wedge is optically coupled to a second side of the second diffraction grating;
a focusing lens, wherein a first side of the focusing lens is optically coupled to a second side of the birefringent wedge;
a first mirror optically coupled to a second side of the focusing lens, wherein the first mirror reflects a first polarized ray of each wavelength of each spatially separated band of wavelengths toward a return direction; and
a second mirror optically coupled to the second side of the focusing lens, wherein the second mirror reflects a second polarized ray of each wavelength of each spatially separated band of wavelengths toward a return direction, wherein a polarization plane orientation of the first and second polarized rays are mutually orthogonal, wherein dispersion is added to the reflected plurality of polarized rays such that the unwanted chromatic dispersion, dispersion slope, and PMD are compensated.

27. The compensator of claim 26, further comprising:
a beam condenser optically coupled between the birefringent wedge and the focusing lens.

28. A dispersion compensator, comprising:
a VIPA optically coupled to an optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
a first diffraction grating, wherein a first side of the first diffraction grating is optically coupled to a second side of the VIPA;
a second diffraction grating, wherein a first side of the second diffraction grating is optically coupled to a second side of the first diffraction grating;
a first birefringent wedge, wherein a first side of the first birefringent wedge is optically coupled to a second side of the second diffraction grating;
a second birefringent wedge, wherein a first side of the second birefringent wedge is optically coupled to a second side of the first birefringent wedge;
a first focusing lens, wherein a first side of the first focusing lens is optically coupled to a second side of the second birefringent wedge;
a second focusing lens, wherein a first side of the second focusing lens is optically coupled to the second side of the second birefringent wedge;
a first mirror optically coupled to a second side of the first focusing lens, wherein the first mirror reflects a first polarized ray of each wavelength of each spatially separated band of wavelengths toward a return direction; and
a second mirror optically coupled to a second side of the second focusing lens, wherein the second mirror reflects a second polarized ray of each wavelength of each spatially separated band of wavelengths toward a return direction, wherein a polarization plane orientation of the first and second polarized rays are mutually orthogonal, wherein dispersion is added to the reflected plurality of polarized rays such that the unwanted chromatic dispersion, dispersion slope, and PMD are compensated.

29. The compensator of claim 28, further comprising:
a beam condenser optically coupled between the first birefringent wedge and the second birefringent wedge.

30. A system, comprising:
an optical fiber transmission system; and
a dispersion compensator optically coupled to the optical fiber transmission system, the dispersion compensator comprising:
a VIPA optically coupled to the optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
at least one diffraction grating, wherein a first side of the at least one diffraction grating is optically coupled to a second side of the VIPA;
at least one birefringent wedge, wherein a first side of the at least one birefringent wedge is optically coupled to a second side of the at least one diffraction grating;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of spatially separated bands of wavelengths toward a return direction, wherein dispersion is added to the reflected plurality of polarized rays such that the unwanted chromatic dispersion, dispersion slope, and PMD are compensated.

31. The system of claim 30, wherein the VIPA separates the wavelengths in a band of wavelengths in each of a plurality of channels, wherein each of the wavelengths in the band is spatially distinguishable from the other wavelengths in the band.

32. The system of claim 30, wherein the at least one diffraction grating spatially separates each band of wavelengths in the plurality of channels traversing through the at least one diffraction grating in the forward direction.

33. The system of claim 30, wherein the at least one birefringent wedge spatially separates each wavelength of each band of wavelengths traversing through the at least one birefringent wedge in the forward direction into the plurality of polarized rays.

34. The system of claim 33, wherein each wavelength is separated into the plurality of polarized rays within a vertical plane.

35. The system of claim 33, wherein each wavelength is separated into the plurality of polarized rays within a horizontal plane.

36. The system of claim 30, wherein the at least one diffraction grating comprises:
a first diffraction grating, wherein a first side of the first diffracting grating is optically coupled to the second side of the VIPA; and
a second diffraction grating, wherein a first side of the second diffraction grating is optically coupled to a second side of the first diffraction grating, wherein a second side of the second diffraction grating is optically coupled to the first side of the at least one birefringent wedge.

37. The system of claim 30, wherein the at least one birefringent wedge comprises:
a first birefringent wedge, wherein a first side of the first birefringent wedge is optically coupled to the second side of the at least one diffraction grating; and
a second birefringent wedge, wherein a first side of the second birefringent wedge is optically coupled to a second side of the first birefringent wedge, wherein a second side of the second birefringent wedge is optically coupled to the first side of the at least one focusing lens.

38. The system of claim 37, further comprising:
a beam condenser optically coupled between the first birefringent wedge and the second birefringent wedge.

39. The system of claim 30, wherein the at least one focusing lens comprises:
a first focusing lens, wherein a first side of the first focusing lens is optically coupled to the second side of the at least one birefringent wedge and a second side of the first focusing lens is optically coupled to the at least one mirror; and
a second focusing lens, wherein a first side of the second focusing lens is optically coupled to the second side of the at least one birefringent wedge and a second side of the second focusing lens is optically coupled to the at least one mirror.

40. The system of claim 30, wherein the at least one mirror comprises a flat surface.

41. The system of claim 30, wherein the at least one mirror comprises a cylindrical concave surface.

42. The system of claim 30, wherein the at least one mirror comprises a cylindrical convex surface.

43. The system of claim 30, wherein the at least one mirror is adjustable in a vertical direction, wherein a vertical adjustment varies an amount of dispersion added.

44. The system of claim 30, wherein the at least one mirror is adjustable in a horizontal direction, wherein a horizontal adjustment varies an amount of dispersion added.

45. The system of claim 30, wherein the at least one mirror is rotationally adjustable, wherein a rotational adjustment varies an amount of dispersion added.

46. The system of claim 30, further comprising:
a beam condenser optically coupled between the at least one birefringent wedge and the at least one focusing lens.

47. A system, comprising:
an optical fiber transmission system; and
a dispersion compensator optically coupled to the optical fiber transmission system, the dispersion compensator comprising:
a VIPA optically coupled to the optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
at least one diffraction grating, wherein a first side of the at least one diffraction grating is optically coupled to a second side of the VIPA;
at least one birefringent wedge, wherein a first side of the at least one birefringent wedge is optically coupled to a second side of the at least one diffraction grating;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of spatially separated bands of wavelengths toward a return direction, wherein dispersion is added to the reflected plurality of polarized rays such that the unwanted chromatic dispersion, dispersion slope, and PMD are compensated, wherein the at least one mirror comprises:
a first mirror optically coupled to the second side of the at least one focusing lens, and
a second mirror optically coupled to the second side of the at least one focusing lens.

48. The system of claim 47, wherein the first mirror reflects a first polarized ray and the second mirror reflects a second polarized ray, wherein a polarization plane orientation of the first and second polarized rays are mutually orthogonal.

49. A system comprising:
an optical fiber transmission system;
an optical circulator, wherein a first port and a third port of the optical circulator are optically coupled to the optical fiber transmission system; and
a dispersion compensator optically coupled to a second port of the optical circulator, the dispersion compensator comprising:
a VIPA optically coupled to the optical fiber transmission system at a first side, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion, dispersion slope, and PMD;
at least one diffraction grating, wherein a first side of the at least one diffraction grating is optically coupled to a second side of the VIPA;
at least one birefringent wedge, wherein a first side of the at least one birefringent wedge is optically coupled to a second side of the at least one diffraction grating;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of spatially separated bands of wavelengths toward a return direction, wherein dispersion is added to the reflected plurality of polarized rays such that the unwanted chromatic dispersion, dispersion slope, and PMD are compensated.

50. A system, comprising:
a dispersion compensator; and
a composite optical signal traversing through the dispersion compensator, wherein the composite signal comprises a plurality of channels, each of the plurality of channels comprising a band of wavelengths, wherein the band of wavelengths comprises unwanted chromatic dispersion, dispersion slope and PMD, wherein the composite optical signal is propagated in a forward direction, wherein the wavelengths in the band of wavelengths in each of the plurality of channels are separated, wherein each of the wavelengths in the band is spatially distinguishable from the other wavelengths in the band, wherein each band of wavelengths in the plurality of channels is spatially separated, wherein each wavelength of each separated band of wavelengths is spatially separated into a plurality of polarized rays, and wherein the plurality of polarized rays is reflected toward a return direction, wherein dispersion is added to the reflected plurality of polarized rays such that the unwanted chromatic dispersion, dispersion slope, and PMD are compensated.

51. A system, comprising:

means for propagating a composite optical signal in a forward direction, wherein the composite optical signal comprises a plurality of channels, each of the plurality of channels comprising a band of wavelengths, wherein the band of wavelengths comprises unwanted chromatic dispersion, dispersion slope and PMD;

means for separating the wavelengths in the band of wavelengths in each of the plurality of channels, wherein each of the wavelengths in the band is spatially distinguishable from the other wavelengths in the band;

means for spatially separating each band of wavelengths in the plurality of channels;

means for spatially separating each wavelength of each separated band of wavelengths into a plurality of polarized rays; and means for reflecting the plurality of polarized rays toward a return direction, wherein dispersion is added to the reflected plurality of polarized rays such that the unwanted chromatic dispersion, dispersion slope, and PMD are compensated.

* * * * *